(12) United States Patent
Liu

(10) Patent No.: US 12,290,050 B2
(45) Date of Patent: May 6, 2025

(54) INTELLIGENT PET ECOSYSTEM

(71) Applicant: SMART PETS HOME INC, Lakewood, CO (US)

(72) Inventor: Yi Liu, Guangzhou (CN)

(73) Assignee: SMART PETS HOME INC

( * ) Notice: Subject to any disclaimer, the term of this patent is extended or adjusted under 35 U.S.C. 154(b) by 0 days.

(21) Appl. No.: 18/935,399

(22) Filed: Nov. 1, 2024

(65) Prior Publication Data

US 2025/0057125 A1    Feb. 20, 2025

(30) Foreign Application Priority Data

Sep. 25, 2024   (CN) .......................... 202411343399.3

(51) Int. Cl.
*G08B 23/00*    (2006.01)
*A01K 1/00*     (2006.01)
*A01K 27/00*    (2006.01)
*A01K 29/00*    (2006.01)

(52) U.S. Cl.
CPC .......... *A01K 27/009* (2013.01); *A01K 1/0047* (2013.01); *A01K 27/001* (2013.01); *A01K 29/005* (2013.01)

(58) Field of Classification Search
CPC .. A01K 27/009; A01K 1/0047; A01K 27/001; A01K 29/005
See application file for complete search history.

(56) References Cited

U.S. PATENT DOCUMENTS

| | | | | |
|---|---|---|---|---|
| 5,746,271 A * | 5/1998 | DeCosta | ................ | A01K 1/034 165/53 |
| 5,787,841 A * | 8/1998 | Titus | .................... | A01K 15/023 119/721 |
| 5,791,294 A * | 8/1998 | Manning | .............. | A01K 15/023 119/908 |
| 5,927,233 A * | 7/1999 | Mainini | ............... | A01K 15/022 119/718 |
| 6,166,643 A * | 12/2000 | Janning | ................ | A01K 15/023 119/908 |
| 6,170,439 B1 * | 1/2001 | Duncan | ................ | A01K 15/021 119/908 |
| 6,191,693 B1 * | 2/2001 | Sangsingkeow | ..... | A01K 15/023 340/552 |
| 6,487,992 B1 * | 12/2002 | Hollis | .................. | A01K 15/022 119/712 |
| 6,561,137 B2 * | 5/2003 | Oakman | ............... | A01K 15/023 119/721 |

(Continued)

*Primary Examiner* — Quang Pham

(57) ABSTRACT

The present application discloses an intelligent pet ecosystem. The system includes: an intelligent pet collar and an intelligent pet house central control system which are communicably connected to each other. The intelligent pet collar acquires a pet position of a target pet, and generates a recall signal, and the recall signal is used for guiding the target pet to return to an intelligent pet house; the intelligent pet collar acquires motion information of the target pet, and generates a feeding plan and a training plan for the target pet according to the motion information; the intelligent pet house central control system controls an open/close state of an entry door of an intelligent pet door and window and controls a working state of an intelligent pet lighting system; and an environment adjustment module controls a working state of a pet cooling and heating fresh air system.

10 Claims, 6 Drawing Sheets

(56) References Cited

U.S. PATENT DOCUMENTS

| | | | | |
|---|---|---|---|---|
| 6,588,376 | B1* | 7/2003 | Groh | A01K 27/009 119/718 |
| 6,637,374 | B2* | 10/2003 | Hawks | A01K 1/034 119/493 |
| 6,921,089 | B2* | 7/2005 | Groh | H01M 50/184 277/921 |
| 6,937,647 | B1* | 8/2005 | Boyd | G08B 13/169 375/228 |
| 7,173,535 | B2* | 2/2007 | Bach | G08B 21/0261 340/573.2 |
| 7,243,614 | B1* | 7/2007 | Byers | A01K 1/0052 119/493 |
| 7,249,572 | B2* | 7/2007 | Goetzl | A01K 15/021 119/765 |
| 7,275,502 | B2* | 10/2007 | Boyd | A01K 1/0353 119/908 |
| 7,319,397 | B2* | 1/2008 | Chung | G01S 5/0009 340/572.1 |
| 7,322,314 | B1* | 1/2008 | Sweeney | A01K 1/032 119/483 |
| 7,394,390 | B2* | 7/2008 | Gerig | G08B 7/06 340/539.19 |
| 7,395,966 | B2* | 7/2008 | Braiman | A01K 29/005 235/454 |
| 7,443,298 | B2* | 10/2008 | Cole | G08B 13/14 700/214 |
| 7,565,885 | B2* | 7/2009 | Moore | A01K 15/021 119/720 |
| 7,779,788 | B2* | 8/2010 | Moore | A01K 15/022 119/721 |
| 7,814,865 | B2* | 10/2010 | Tracy | A01K 15/023 119/859 |
| 7,856,947 | B2* | 12/2010 | Giunta | A01K 15/023 119/721 |
| 7,934,472 | B2* | 5/2011 | Weatherford | A01K 1/033 119/493 |
| 7,944,359 | B2* | 5/2011 | Fong | G08B 21/22 340/573.4 |
| 7,946,252 | B2* | 5/2011 | Lee, IV | A01K 15/022 340/573.3 |
| 8,011,327 | B2* | 9/2011 | Mainini | A01K 15/021 119/859 |
| 8,269,504 | B2* | 9/2012 | Gerig | G01R 31/08 324/529 |
| 8,276,543 | B2* | 10/2012 | Oedekoven | A01K 1/00 119/449 |
| 8,297,233 | B2* | 10/2012 | Rich | A01K 27/009 119/719 |
| 8,342,135 | B2* | 1/2013 | Peinetti | A01K 15/023 119/721 |
| 8,430,064 | B2* | 4/2013 | Groh | A01K 15/023 119/721 |
| 8,436,735 | B2* | 5/2013 | Mainini | A01K 29/005 340/573.3 |
| 8,447,510 | B2* | 5/2013 | Fitzpatrick | G06F 16/9535 707/999.005 |
| 8,451,130 | B2* | 5/2013 | Mainini | G06F 3/017 340/573.3 |
| 8,456,296 | B2* | 6/2013 | Piltonen | G01S 3/40 340/8.1 |
| 8,635,974 | B2* | 1/2014 | Lemmon | F24F 11/30 119/493 |
| 8,714,113 | B2* | 5/2014 | Lee, IV | A01K 15/022 119/718 |
| 8,779,925 | B2* | 7/2014 | Rich | G08B 21/18 340/564 |
| 8,917,172 | B2* | 12/2014 | Charych | A01K 15/023 340/539.11 |
| 8,967,085 | B2* | 3/2015 | Gillis | A01K 1/0017 119/484 |
| 9,031,714 | B1* | 5/2015 | Everett | G06F 9/451 701/2 |
| 9,125,380 | B2* | 9/2015 | Deutsch | A01K 15/021 |
| 9,131,660 | B2* | 9/2015 | Womble | A01K 7/02 |
| 9,204,251 | B1* | 12/2015 | Mendelson | G01C 21/206 |
| 9,949,461 | B2* | 4/2018 | Frazier | A01K 29/005 |
| 10,064,392 | B1* | 9/2018 | Betts-Lacroix | A01K 1/031 |
| 10,231,440 | B2* | 3/2019 | Seltzer | A01K 29/005 |
| 10,349,631 | B2* | 7/2019 | Bonge, Jr. | G01S 19/16 |
| 10,645,908 | B2* | 5/2020 | Seltzer | A01K 27/001 |
| 10,842,128 | B2* | 11/2020 | McFarland | G05F 1/10 |
| 10,986,813 | B2* | 4/2021 | Seltzer | A01K 15/021 |
| 11,006,615 | B1* | 5/2021 | Xu | A01K 5/0266 |
| 11,109,182 | B2* | 8/2021 | Floyd | H04W 4/021 |
| 11,140,872 | B2* | 10/2021 | Kennedy | A01K 27/001 |
| 11,166,435 | B2* | 11/2021 | Anderton | A01K 27/009 |
| 11,238,889 | B2* | 2/2022 | Seltzer | G10L 17/26 |
| 11,372,077 | B2* | 6/2022 | Seltzer | A01K 11/008 |
| 11,394,196 | B2* | 7/2022 | Olszyk | H02H 7/20 |
| 11,490,597 | B2* | 11/2022 | Seltzer | A01K 15/023 |
| 11,849,699 | B2* | 12/2023 | Bunton | A61B 5/4812 |
| 11,944,070 | B2* | 4/2024 | Piggott | H02S 40/38 |
| 12,048,290 | B1* | 7/2024 | Feng | G08C 17/02 |
| 12,089,565 | B2* | 9/2024 | Mainini | A01K 27/009 |
| 12,102,059 | B2* | 10/2024 | Ehrman | A01K 15/023 |
| 12,156,510 | B2* | 12/2024 | Ehrman | H04W 4/021 |
| 12,213,450 | B2* | 2/2025 | Huang | A01K 15/02 |
| 2001/0035134 | A1 | 11/2001 | Stapelfeld | A01K 15/023 119/720 |
| 2001/0042522 | A1* | 11/2001 | Barry | A01K 15/023 119/721 |
| 2002/0196151 | A1* | 12/2002 | Troxler | G08B 21/0277 340/573.3 |
| 2003/0034887 | A1* | 2/2003 | Crabtree | G01S 3/54 340/568.1 |
| 2003/0060155 | A1* | 3/2003 | Baumgartner | A01K 1/0064 454/341 |
| 2005/0139169 | A1* | 6/2005 | So | A01K 15/023 119/721 |
| 2005/0145196 | A1* | 7/2005 | Crist | A01K 15/022 119/718 |
| 2005/0145198 | A1* | 7/2005 | Crist | A01K 15/022 119/718 |
| 2005/0172912 | A1* | 8/2005 | Crist | A01K 15/021 119/720 |
| 2005/0217606 | A1* | 10/2005 | Lee | A01K 27/009 119/720 |
| 2006/0092676 | A1* | 5/2006 | Liptak | H02M 3/337 363/56.02 |
| 2006/0102101 | A1* | 5/2006 | Kim | A01K 15/023 119/720 |
| 2006/0112901 | A1* | 6/2006 | Gomez | A01K 15/023 119/721 |
| 2007/0103296 | A1* | 5/2007 | Paessel | A01K 29/005 340/539.22 |
| 2007/0204803 | A1* | 9/2007 | Ramsay | A01K 27/009 119/720 |
| 2007/0204804 | A1* | 9/2007 | Swanson | A01K 15/023 119/721 |
| 2007/0266959 | A1* | 11/2007 | Brooks | A01K 29/005 119/720 |
| 2008/0004539 | A1* | 1/2008 | Ross | A61B 5/02405 600/509 |
| 2008/0017133 | A1* | 1/2008 | Moore | A01K 15/023 119/720 |
| 2008/0036610 | A1* | 2/2008 | Hokuf | G08B 21/0269 340/573.3 |
| 2008/0129457 | A1* | 6/2008 | Ritter | G07C 9/257 340/10.1 |
| 2008/0141949 | A1* | 6/2008 | Taylor | A01K 27/009 119/712 |
| 2008/0143516 | A1* | 6/2008 | Mock | G08B 21/0269 455/67.11 |
| 2008/0163827 | A1* | 7/2008 | Goetzl | A01K 15/021 119/859 |
| 2008/0163829 | A1* | 7/2008 | Lee | A01K 15/022 119/718 |
| 2008/0168949 | A1* | 7/2008 | Belcher | A01K 15/023 119/721 |

(56) References Cited

U.S. PATENT DOCUMENTS

| | | | |
|---|---|---|---|
| 2008/0168950 A1* | 7/2008 | Moore | A01K 15/023 119/721 |
| 2008/0236514 A1* | 10/2008 | Johnson | A01K 15/021 340/573.3 |
| 2008/0272908 A1* | 11/2008 | Boyd | A01K 15/023 340/573.3 |
| 2009/0102668 A1* | 4/2009 | Thompson | A01K 15/023 340/573.3 |
| 2010/0047119 A1* | 2/2010 | Cressy | A61L 2/202 119/167 |
| 2010/0107985 A1* | 5/2010 | O'Hare | A01K 29/005 119/174 |
| 2010/0154714 A1* | 6/2010 | DeVilliers | A01K 1/12 119/14.08 |
| 2010/0231391 A1* | 9/2010 | Dror | A01K 15/021 340/573.3 |
| 2010/0315241 A1* | 12/2010 | Jow | A01K 11/008 340/573.3 |
| 2011/0139076 A1* | 6/2011 | Pu | A01K 5/0291 119/51.02 |
| 2011/0140967 A1* | 6/2011 | Lopez Pou | A01K 11/008 342/450 |
| 2012/0000431 A1* | 1/2012 | Khoshkish | A01K 15/023 119/720 |
| 2012/0132151 A1* | 5/2012 | Touchton | H04B 1/385 119/720 |
| 2012/0312250 A1* | 12/2012 | Jesurum | A01K 15/023 119/721 |
| 2013/0099920 A1* | 4/2013 | Song | G08B 21/023 340/539.13 |
| 2013/0169441 A1* | 7/2013 | Wilson | A01K 27/006 340/573.3 |
| 2013/0265165 A1* | 10/2013 | So | A01K 15/022 340/573.3 |
| 2013/0298846 A1* | 11/2013 | Mainini | A01K 15/021 119/719 |
| 2013/0321159 A1* | 12/2013 | Schofield | A01K 11/008 340/573.3 |
| 2014/0020635 A1* | 1/2014 | Sayers | A01K 15/021 348/143 |
| 2014/0062695 A1* | 3/2014 | Rosen | G08B 21/0219 340/539.13 |
| 2014/0123912 A1* | 5/2014 | Menkes | A61B 5/0022 119/859 |
| 2014/0174376 A1* | 6/2014 | Touchton | A01K 29/005 119/719 |
| 2014/0232541 A1* | 8/2014 | Trenkle | G08B 25/10 340/539.13 |
| 2014/0257433 A1* | 9/2014 | Ackermann | A61N 1/37217 607/116 |
| 2014/0320347 A1* | 10/2014 | Rochelle | A01K 15/023 342/385 |
| 2015/0034014 A1* | 2/2015 | Van Kuilenburg | A01K 5/02 119/51.01 |
| 2015/0040840 A1* | 2/2015 | Muetzel | A01K 15/021 342/450 |
| 2015/0053144 A1* | 2/2015 | Bianchi | A01K 27/001 119/720 |
| 2015/0075446 A1* | 3/2015 | Hu | A01K 15/023 119/718 |
| 2015/0107531 A1* | 4/2015 | Golden | H04W 4/024 119/719 |
| 2015/0143750 A1* | 5/2015 | Jalbert | A01K 5/025 49/25 |
| 2015/0149050 A1* | 5/2015 | Palsgaard | A01K 5/0266 701/50 |
| 2015/0173327 A1* | 6/2015 | Gerig | A01K 15/023 119/721 |
| 2015/0181837 A1* | 7/2015 | Cornwell | A01K 5/0291 119/51.02 |
| 2015/0223013 A1* | 8/2015 | Park | H04L 67/52 455/41.2 |
| 2015/0250137 A1* | 9/2015 | Palsgaard | A01K 5/0266 119/57.92 |
| 2015/0350848 A1* | 12/2015 | Eramian | H04W 4/029 455/404.2 |
| 2016/0000036 A1* | 1/2016 | Cornwell, Jr. | A01K 5/0291 119/51.11 |
| 2016/0021506 A1* | 1/2016 | Bonge, Jr. | G16H 40/67 717/173 |
| 2016/0029592 A1* | 2/2016 | Springer | G08C 17/02 119/51.11 |
| 2016/0316711 A1* | 11/2016 | Davis | A01K 1/0245 |
| 2016/0353705 A1* | 12/2016 | Weiss | A01K 1/0047 |
| 2016/0370863 A1* | 12/2016 | Jones | G06F 3/011 |
| 2017/0013802 A1* | 1/2017 | Zimmerman | G06K 7/10366 |
| 2017/0064925 A1* | 3/2017 | Rogers | A01K 15/02 |
| 2017/0094946 A1* | 4/2017 | Giunta | A01K 15/022 |
| 2017/0314369 A1* | 11/2017 | Rosano | H04N 13/271 |
| 2018/0228128 A1* | 8/2018 | Gibbs | A01M 29/16 |
| 2019/0104707 A1* | 4/2019 | Gotts | A01K 27/001 |
| 2019/0155388 A1* | 5/2019 | Lee | G06F 3/016 |
| 2019/0174721 A1* | 6/2019 | Stapelfeld | A01K 29/005 |
| 2019/0183388 A1* | 6/2019 | Cohen | A63B 23/02 |
| 2021/0352872 A1* | 11/2021 | Suh | G05D 3/12 |
| 2022/0051106 A1* | 2/2022 | Luo | G06N 3/092 |
| 2022/0061273 A1* | 3/2022 | Wolf, II | A01K 1/0064 |
| 2022/0083012 A1* | 3/2022 | Luo | G06N 20/00 |
| 2022/0104463 A1* | 4/2022 | Spears | G06V 40/10 |
| 2023/0309509 A1* | 10/2023 | Gopinath | A01K 27/009 119/51.02 |
| 2023/0320317 A1* | 10/2023 | Olvey | A01K 29/005 119/416 |
| 2024/0000046 A1* | 1/2024 | Li | A01K 29/005 |
| 2024/0282028 A1* | 8/2024 | Guay | G06T 13/40 |
| 2024/0341673 A1* | 10/2024 | Antoine | A61B 5/683 |
| 2024/0349703 A1* | 10/2024 | De Samber | A01K 1/0082 |
| 2024/0365742 A1* | 11/2024 | Beresford | A01K 1/0076 |

* cited by examiner

INTELLIGENT PET ECOSYSTEM

CROSS-REFERENCE TO RELATED APPLICATIONS

This application claims priority to Chinese patent application No. 2024113433993, filed on Sep. 25, 2024, which is hereby incorporated by reference in its entirety.

TECHNICAL FIELD

The present application belongs to the technical field of pet management, and in particular, to an intelligent pet ecosystem.

BACKGROUND

With the improvement of the living standard and the elevation of statuses of pets, there is an increasing demand for pet markets and an increasing growth potential in the pet markets. Users have a significant demand for management on activities of pets.

At present, a pet interaction system is composed of a terminal, an intelligent pet house, a pet collar, and an interactive robot. Through a mobile terminal or a computer during fragmented time, a pet owner can observe the pet, observe an environment around the pet, detect physiological information of the pet, and remotely control the interactive robot to interact with the pet. The intelligent pet house automatically feeds and bathes the pet, and automatically charges the interactive robot.

However, the above pet interaction system tends to focus on remote interaction between pets and users, an automatic feeding function, and the like, but the users need to monitor states of the pets in real time and cannot automate the management on the activities of the pets.

SUMMARY

The present application aims to at least solve one of the technical problems in the existing technology. To this end, the present application provides an intelligent pet ecosystem. The system achieves automatic intelligent management on activities of pets.

The present application provides an intelligent pet ecosystem. The system includes an intelligent pet collar and an intelligent pet house central control system which are communicably connected to each other, wherein the intelligent pet house central control system is connected to an embedded functional module in an intelligent pet house; a target pet wears the intelligent pet collar; the intelligent pet house is configured to define a living range of the target pet;

the intelligent pet collar comprises a positioning sensing module, a recall module, and a motion module;

the positioning sensing module is configured to acquire a pet position of the target pet;

the recall module is connected to the positioning sensing module and is configured to generate a recall signal based on a positional relationship between the living range and the pet position, and the recall signal is used for guiding the target pet to return to the intelligent pet house;

the motion module is connected to the positioning sensing module and is configured to: acquire motion information of the target pet, and generate a feeding plan and a training plan for the target pet according to the motion information;

the intelligent pet house central control system comprises an enter and leave control module, a lighting control module, and an environment adjustment module; the embedded functional module comprises an intelligent pet door and window, an intelligent pet lighting system, and an intelligent pet cooling and heating fresh air system;

the enter and leave control module is configured to control an open/close state of an entry door of the intelligent pet door and window based on the positional relationship between the living range and the pet position;

the lighting control module is configured to control a working state of the intelligent pet lighting system based on the positional relationship between the living range and the pet position; and the environment adjustment module is configured to control a working state of the pet cooling and heating fresh air system according to environment information of the intelligent pet house.

According to an embodiment of the present application, the pet position includes a first pet position and a second pet position; the positioning sensing module includes an electronic sensing submodule and a satellite positioning submodule which are communicably connected to each other; the intelligent pet door and window includes a signal receiver arranged at the entry door;

the electronic sensing submodule is configured to sense the signal receiver to determine a sensing distance of the target pet; and the satellite positioning submodule is configured to: acquire position information of the target pet; determine the first pet position according to the sensing distance and the position information in a case of determining that the sensing distance has been received; and determine the position information to be the second pet position in a case of determining that the sensing distance is not received.

According to an embodiment of the present application, the electronic sensing submodule includes a Bluetooth low energy tag, and the signal receiver is a Bluetooth adapter.

According to an embodiment of the present application, the enter and leave control module includes an enter control submodule and a leave control submodule which are communicably connected to each other;

the enter control submodule is configured to: determine the sensing distance in the first pet position in a case that the first pet position of the electronic sensing submodule has been received; and control the entry door to be opened in a case of determining, according to the first pet position, that the target pet is located beyond the living range and the sensing distance is beyond a security alert range, wherein the security alert range represents that a distance to the entry door is within 5 cm;

the leave control submodule is configured to control the entry door to be opened in a case of determining that the first pet position is within the living range and beyond the security alert range and a number of times the sensing distance being less than a preset door line distance is greater than a preset number of times.

According to an embodiment of the present application, the intelligent pet house is provided with an image acquisition device, and the image acquisition device is connected to the leave control submodule of the enter and leave control module;

the image acquisition device is configured to acquire first image information inside the intelligent pet house; and the leave control submodule is further configured to control the entry door to be closed in a case of determining that the first image information comprises the target pet.

According to an embodiment of the present application, the enter and leave control module further includes a face recognition submodule; the face recognition submodule is connected to the enter control submodule of the enter and leave control module; the image acquisition device of the intelligent pet house is connected to the face recognition submodule;

the image acquisition device is further configured to acquire second image information at the entry door; and the face recognition submodule is further configured to trigger the enter control submodule to control the entry door to be opened in a case of determining that the second image information comprises face information and the face information is successfully matched with a face of the target pet.

According to an embodiment of the present application, the intelligent pet lighting system includes a lamp and an interest lamp; the lighting control module includes a lamp submodule and an interest lamp submodule;

the lamp submodule is configured to: control the lamp to be turned off in a case of determining that the pet position is beyond the living range, and control the lamp to be turned on in a case of determining that the pet position is within the living range; and the interest lamp submodule is configured to control the interest lamp to act in a case that the recall signal has been received.

According to an embodiment of the present application, the interest lamp submodule is further configured to control the interest lamp to act according to a lighting trajectory and lighting duration of the training plan, to guide the target pet to be trained according to the training plan.

According to an embodiment of the present application, the recall signal includes a visual recall signal, a tactile recall signal, and an auditory recall signal;

the recall module comprises a processor, and a visual submodule, a tactile submodule, and an auditory submodule which are connected to the processor;

the processor is configured to: in a case of determining, according to a pet distance between the living range and the pet position, that the pet distance is greater than or equal to a pre-warning distance threshold, trigger the visual submodule to generate the visual recall signal, and send the visual recall signal to the lighting control module; in a case of determining that the pet distance is less than the pre-warning distance threshold and greater than a safe distance threshold, trigger the tactile submodule to generate the tactile recall signal; and in a case of determining that the pet distance is less than the safe distance threshold, trigger the auditory submodule to generate the auditory recall signal; a value range of the pre-warning distance threshold is 5 meters to 15 meters; and a value range of the safe distance threshold is 15 meters to 20 meters.

According to an embodiment of the present application, the environment adjustment module includes a noise control submodule and an air index control submodule; the intelligent pet cooling and heating fresh air system includes a dust purification device, a deodorization device, and an air conditioning device;

the noise control submodule is configured to control the intelligent pet cooling and heating fresh air system to shut down the devices in a case of determining that a noise intensity in the intelligent pet house is greater than a preset decibel; and the air index control submodule is configured to: control the dust purification device to operate according to a dust concentration in the intelligent pet house, control the deodorization device to operate according to an odor intensity in the intelligent pet house, and control the air conditioning device to operate according to an indoor temperature in the intelligent pet house.

The additional aspects and advantages of the present application will be partially provided in the following descriptions, some of which will become apparent from the following descriptions, or learned through the practice of the present application.

Compared with the existing technology, the intelligent pet ecosystem provided in the present invention has the following beneficial effects:

(1) By acquiring information of the position and motion of the target pet through the intelligent pet collar, the target pet can be automatically recalled and prevented from getting lost. The personalized feeding and training plans are generated for the target pet, so that multi-aspect intelligent management on the target pet is achieved. The intelligent pet house central control system performs intelligent autonomous control on the intelligent pet door and window, the intelligent pet lighting system, and the pet cooling and heating fresh air system, and can comprehensively manage the life of the target pet from the aspects of entering and leaving, lighting, and environment. The intelligent pet ecosystem is constructed by the intelligent pet collar and the intelligent pet house central control system, so that a passive living environment and a passive living scenario are achieved. The target pet can be self-sufficient, which reduces the partition of the pet owner in the basic life of the target pet and improves the safety and living quality of the target pet. This brings great convenience and comfort to users and pets, achieves effective, comprehensive, and intelligent automatic management and optimization on the activities of the pets, effectively relieves the pet keeping burden on the time, energy, and responsibilities of the users, and achieves worry-free pet keeping.

(2) By use of the enter control submodule and the leave control submodule to control the opening and closing of the entry door, the target pet can leave the intelligent pet house and go outdoors, and the entry door can be automatically managed when the target pet enters the intelligent pet house. Especially in adverse weather or when a user is not at home, the target pet can still freely enter and leave the intelligent pet house, enjoy outdoor activities, or return to the warm home. By use of the leave control submodule to determine whether the first image information includes the target pet, the entry door is controlled to be closed, and the target pet is locked in the intelligent pet house. A more intelligent and comfortable living environment is created for the target pet. By use of the face recognition submodule to perform identity recognition and verification on the target pet, non-permitted pets or other animals are prevented from entering the intelligent pet house, achieving non-intrusive operations when the target pet approaches or leaves the intelligent pet house, and improving the intelligence level of the intelligent pet house.

(3) By use of the interest lamp submodule to control the interest lamp according to the personalized lighting trajectory and lighting duration, the target pet is guided to be trained according to the training plan. This helps maintain the healthy weight of the target pet, provides psychological stimulation, reduces the anxiety and boredom of the target pet, and can save the energy of a user and improve the living experience of the target pet.

BRIEF DESCRIPTION OF DRAWINGS

These and other aspects and advantages of embodiments of the present application will become apparent and more readily appreciated from the following descriptions made with reference to the drawings

NUMERALS IN THE DRAWINGS

110: intelligent pet collar; 111: positioning sensing module; 112: recall module; 113: motion module; 120: intelligent pet house central control system; 121: enter and leave control module; 122: lighting control module; and 123: environment adjustment module.

DETAILED DESCRIPTION

The technical solutions in the embodiments of the present application are clearly described below with reference to the accompanying drawings in the embodiments of the present application. Apparently, the described embodiments are merely some rather than all of the embodiments of the present application. All other embodiments obtained by persons skilled in the art based on the embodiments of the present application fall within the protection scope of the present application.

This specification and claims of the present application, and terms "first" and "second" are used to distinguish similar objects, but are unnecessarily used to describe a specific sequence or order. It should be understood that data used like this is interchangeable where appropriate, so that the embodiments of the present application can be implemented in an order other than those illustrated or described here. Furthermore, objects distinguished by "first", "second", and the like are usually of the same class and do not limit the number of objects. For example, the first object can be one or multiple. In addition, "and/or" used in this specification and the claims represent at least one of the connected objects. Symbol "/" usually represents an "or" relationship between front and back associated objects.

An intelligent pet ecosystem according to an embodiment of the present application is described below through specific embodiments and their application scenarios in combination with the accompanying drawings.

Figure 1:
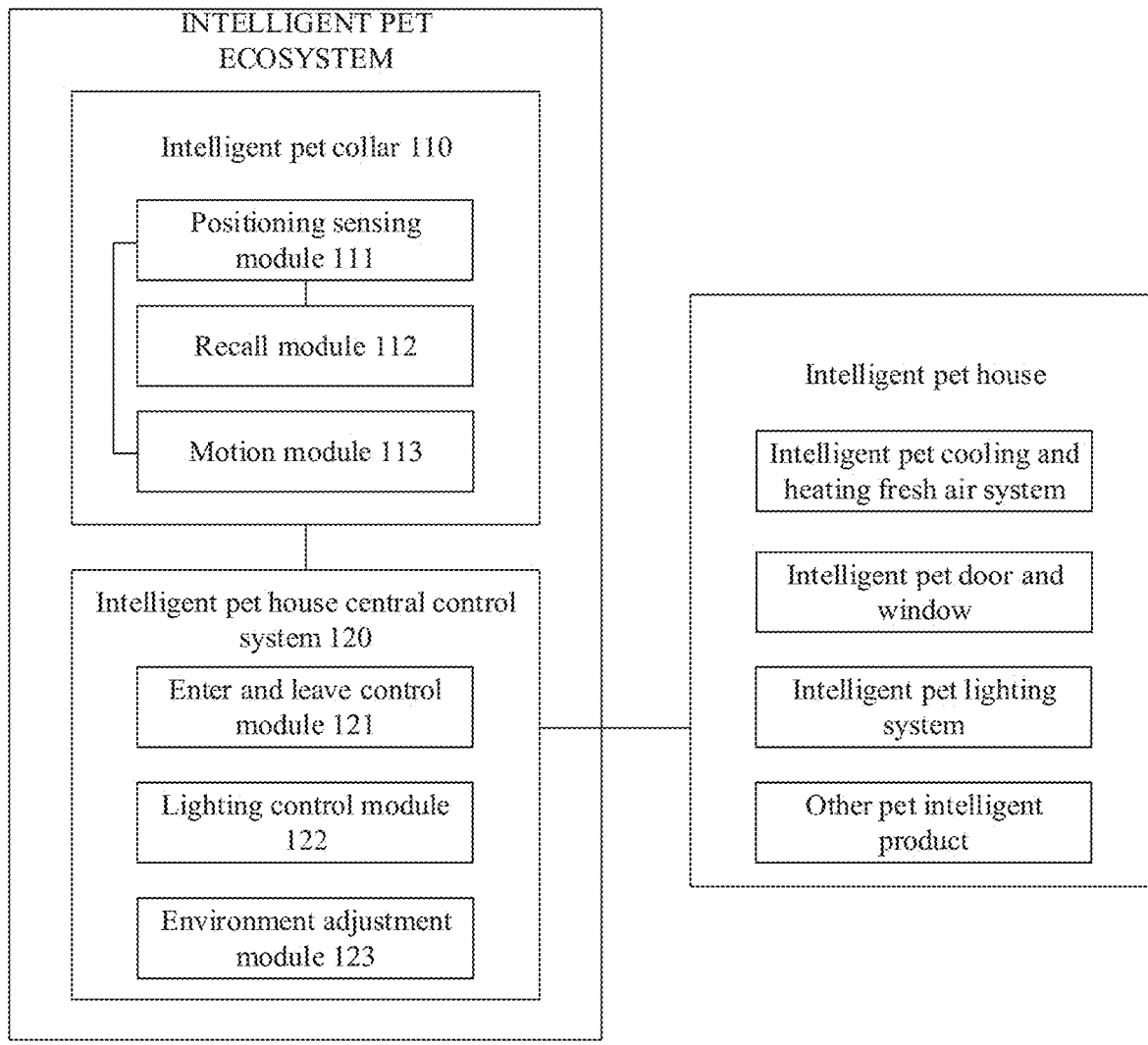
FIG. 1 is a schematic structural diagram of an intelligent pet ecosystem according to an embodiment of the present application.

As shown in FIG. 1, an intelligent pet ecosystem includes an intelligent pet collar 110 and an intelligent pet house central control system 120 which are communicably connected to each other. The intelligent pet house central control system 120 is connected to an embedded functional module in an intelligent pet house. A target pet wears the intelligent pet collar 110. The intelligent pet house is configured to define a living range of the target pet.

The intelligent pet collar 110 includes a positioning sensing module 111, a recall module 112, and a motion module 113.

The positioning sensing module 111 is configured to acquire a pet position of the target pet.

The recall module 112 is connected to the positioning sensing module 111 and is configured to generate a recall signal based on a positional relationship between the living range and the pet position, and the recall signal is used for guiding the target pet to return to the intelligent pet house.

The motion module 113 is connected to the positioning sensing module 111 and is configured to: acquire motion information of the target pet, and generate a feeding plan and a training plan for the target pet according to the motion information.

Figure 2:
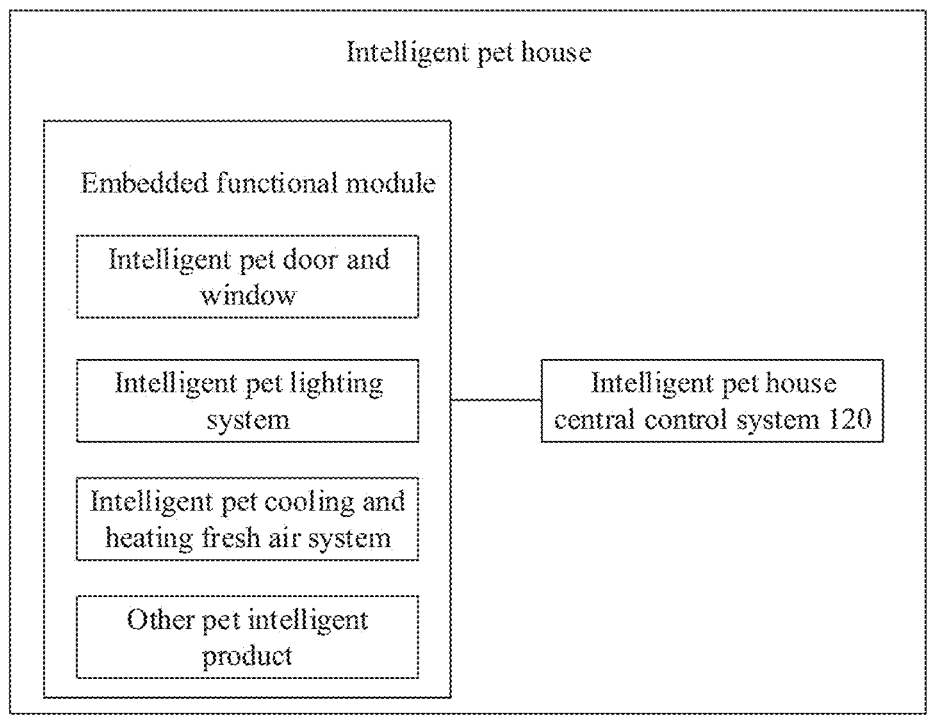
FIG. 2 is a schematic structural diagram of an intelligent pet house according to an embodiment of the present application.

The intelligent pet house central control system 120 includes an enter and leave control module 121 a lighting control module 122, and an environment adjustment module 123. As shown in FIG. 2, the embedded functional module includes an intelligent pet door and window, an intelligent pet lighting system, and an intelligent pet cooling and heating fresh air system.

The enter and leave control module 121 is configured to control an open/close state of an entry door of the intelligent pet door and window based on the positional relationship between the living range and the pet position.

The lighting control module 122 is configured to control a working state of the intelligent pet lighting system based on the positional relationship between the living range and the pet position.

The environment adjustment module 123 is configured to control a working state of the pet cooling and heating fresh air system according to environment information of the intelligent pet house.

It can be understood that the target pet is a management object of the intelligent pet ecosystem in the present application, which can be a cat, a dog, a rabbit, or the like.

The intelligent pet house is a place where the target pet lives and resides. Within the living range defined by the intelligent pet house, the target pet can engage in activities such as sleeping, eating, drinking, and playing. The embedded functional module of the intelligent pet house is in a modular design, which greatly saves a space in the intelligent pet house. The embedded functional module of the intelligent pet house can be expanded and combined to bring richer living experience to the target pet.

Wherein the embedded functional module of the intelligent pet house can share a power supply. One power bus is used to supply power to devices such as an intelligent pet door and window, an intelligent pet lighting system, and an intelligent pet cooling and heating fresh air system.

The intelligent pet collar 110 and the intelligent pet house central control system 120 are communicably connected to each other. The intelligent pet house central control system 120 can have Bluetooth, wireless local area network (Wi-Fi), and Zigbee communication protocol functions to achieve communications with the intelligent pet collar 110 and enable interaction between them.

It should be noted that the intelligent pet house central control system 120 may be a device with an independent data processing capability, or may include an intelligent gateway installed in the intelligent pet house and a server or cloud device with a data processing capability. The intelligent gateway forwards acquired and received information to the server or cloud device for data processing, generates a control instruction, and then forwards the control instruction to the embedded functional module, to achieve control over the intelligent pet house.

Wherein the positioning sensing module 111 of the intelligent pet collar 110 can be provided with a positioning apparatus such as a global positioning system (GPS) receiver, a Bluetooth locator, or a wireless network locator, which can locate the target pet. The pet position can be represented as position coordinates of the target pet.

The recall module 112 may include a signal generation apparatus in the form of sound, light, and electricity. Correspondingly, the recall signal can be represented as a signal in the form of sound, light, and electricity, which can form an intelligent electronic fence for the target pet.

In practical execution, the recall module 112 stores the living range and receives in real time the pet position acquired by the positioning sensing module 111. In a case of determining that a distance between the pet position of the target pet and the living range is greater than a distance threshold, the recall module 112 generates a recall signal to recall the target pet until the distance between the pet position and the living range is not greater than the distance threshold, or until the target pet returns to the intelligent pet house. By monitoring the position of the target pet in real time and recalling the target pet if the target pet moves beyond the distance threshold, the target pet can be effectively prevented from getting lost or encountering danger.

The motion information may include motion-related information such as a motion duration, a motion frequency, and heart rate changes of the target pet, and motion distributions and motion habits of the target pet inside and outside the intelligent pet house.

The feeding plan may include an amount of food, nutrient composition, and feeding time.

The training plan may include a motion type and a motion duration of the target pet. The motion type can be selected based on a motion preference of the target pet, such as frisbee, walking, and running.

In practical execution, the motion module 113 can record the motion information of the target pet, and calculate energy consumption of the target pet at different time periods, as well as health indicators such as the weight, blood pressure, and metabolic level of the target pet, according to the motion information. The motion module generates the feeding plan and the training plan for the target pet, to provide reference for feeding the target pet. This facilitates appropriate feeding and appropriate arrangement of the motion of the target pet, ensures a healthy posture of the target pet, and assists in intelligent training of the target pet.

As can be seen from the above, the intelligent pet collar 110 can prevent the target pet from getting lost by providing various functions such as positioning, recalling, and motion recording. It helps a user better understand behaviors and a health state of the pet, thus achieving more accurate management and care. The user is service object of the intelligent pet ecosystem.

An opened/closed state of the entry door is used for indicating an availability of a path of the entry door to enter or leave the intelligent pet house, including an opened state or a closed state. A working state of the intelligent pet lighting system is used for representing lighting and extinguishing corresponding to current flowing and disconnection of a lighting device in the intelligent pet house, including an on state and an off state, as well as a working mode of the lighting device.

The enter and leave control module 121 is configured to: control an entry door driving device, drive the entry door to be opened or closed, and achieve automatic enter and leave control on the target pet.

In practical execution, the enter and leave control module 121 controls the entry door to be closed in a case of determining that the pet position is within the living range, and controls the entry door to be opened in a case of determining that the pet position is beyond the living range.

The lighting control module 122 is configured to control turning on or turning off of the lighting device in the intelligent pet lighting system, to improve the living quality of the target pet and reduce the energy consumption.

In practical execution, the lighting control module 122 controls the lighting device to be turned on in a case of determining that the pet position is within the living range, and controls the lighting device to be turned off in a case of determining that the pet position is beyond the living range.

The intelligent pet house central control system 120 controls the opened/closed state of the entry door and the on/off state of lighting device of the intelligent pet house, and can comprehensively manage the living environment of the target pet from the aspects of entering, leaving, lighting, and the like, to ensure that the target pet lives in a comfortable and healthy environment.

The environment adjustment module 123 is configured to control the working state of the pet cooling and heating fresh air system according to environment information of the intelligent pet house, to adjust a temperature and air quality in the intelligent pet house.

The environment information can include a temperature and a carbon dioxide concentration in the intelligent pet house.

In practical execution, the environment adjustment module 123 controls the pet cooling and heating fresh air system to perform heating or cooling in a case of determining, according to the environment information, that the temperature is below or above a preset temperature range, and controls the pet cooling and heating fresh air system to activate a fresh air mode in a case of determining that the carbon dioxide concentration is greater than a preset carbon dioxide concentration.

In addition, the intelligent pet house central control system 120 may further include a life control module. The life control module can control other intelligent pet products. Other intelligent pet products may include an intelligent feeder, an intelligent toilet, an intelligent drinking fountain, an intelligent bathtub, and the like.

The life control module controls food feeding of the intelligent feeder according to remaining food of the intelligent feeder, controls adding of drinking water to the intelligent feeder according to remaining drinking water in the intelligent drinking fountain, further controls automatic cleaning of the toilet in the intelligent pet house according to a weight change of an object in the intelligent toilet, or open or close an entrance of the intelligent toilet according to a positional relationship between the pet position of the target pet and the intelligent toilet in the intelligent pet house, thereby meeting the basic living needs of the target pet such as eating, drinking, pooing, peeing, and sleeping.

The intelligent pet house central control system 120 is further provided with an expansion module. The expansion module can be configured to control other intelligent pet products added to the intelligent pet house.

A terminal device includes at least one electronic device with data processing, communication, and display functions, such as a mobile phone, a tablet, and a laptop. An application (App) protocol can be configured between the terminal device and the intelligent pet collar 110, as well as the intelligent pet house central control system 120. By installing an App, which can bind the intelligent pet collar 110 with the intelligent pet house central control system 120, in the terminal device, communication between the collar and the intelligent pet house central control system 120, data transmission, and control over the intelligent pet collar 110 and the intelligent pet house central control system 120 can be achieved.

For example, pet-related information is configured for the intelligent pet collar 110 and the intelligent pet house central control system 120 through the App of the terminal device.

The terminal device can be held by the owner of the target pet as a user, so that the user can conveniently monitor and control the state of the pet at any place. This saves the energy and time of the user. The user has more time and energy to interact and play with the pet, which greatly improves the living quality of the target pet and the user experience, and enhances the emotional connection between the user and the target pet.

In practical execution, the terminal device receives the pet position acquired by the positioning sensing module 111 and the motion information acquired by the motion module 113, generates the personalized feeding plan and training plan, receives the control over the opened/closed state of the entry door by the enter and leave control module 121 and the control over the on/off state of the intelligent pet lighting system by the lighting control module 122, displays the information, and provides a control interface. The user can enter instructions on the control interface of the terminal device to control the intelligent pet collar 110 and the intelligent pet house central control system 120. The intelligent pet collar 110 and the intelligent pet house central control system 120 preferentially execute the instructions of the user.

In the embodiments of the present application, the intelligent pet collar 110 integrates multiple functions such as positioning, recalling, and motion monitoring. In conjunction with the modular design of the intelligent pet house central control system 120, a user can more easily know the whereabouts, health state, and motion of the pet through the terminal device in an intelligent and automatic management way.

According to the intelligent pet ecosystem provided in the embodiments of the present application, By acquiring information of the position and motion of the target pet through the intelligent pet collar 110, the target pet can be automatically recalled and prevented from getting lost. The personalized feeding and training plans are generated for the target pet, so that multi-aspect intelligent management on the target pet is achieved. The intelligent pet house central control system 120 performs intelligent autonomous control on the intelligent pet door and window, the intelligent pet lighting system, and the pet cooling and heating fresh air system, and can comprehensively manage the life of the target pet from the aspects of entering and leaving, lighting, and environment. The intelligent pet ecosystem is constructed by the intelligent pet collar 110 and the intelligent pet house central control system 120, so that a passive living environment and a passive living scenario are achieved. The target pet can be self-sufficient, which reduces the partition of the pet owner in the basic life of the target pet and improves the safety and living quality of the target pet. This brings great convenience and comfort to users and pets, achieves effective, comprehensive, and intelligent automatic management and optimization on the activities of the pets, effectively relieves the pet keeping burden on the time, energy, and responsibilities of the users, and achieves worry-free pet keeping.

Figure 3:
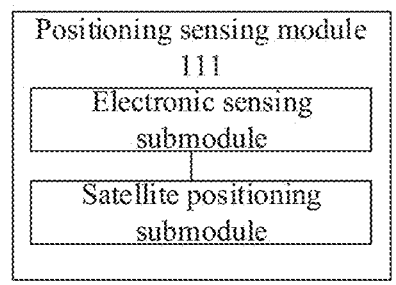
FIG. 3 is a schematic structural diagram of a positioning sensing module according to an embodiment of the present application.

In some embodiments, as shown in FIG. 3, the pet position includes a first pet position and a second pet position. The positioning sensing module 111 includes an electronic sensing submodule and a satellite positioning submodule which are communicably connected to each other. The intelligent pet door and window includes a signal receiver arranged at the entry door.

The electronic sensing submodule is configured to sense the signal receiver to determine a sensing distance of the target pet.

The satellite positioning submodule is configured to: acquire position information of the target pet; determine the first pet position according to the sensing distance and the position information in a case of determining that the sensing distance has been received; and determine the position information to be the second pet position in a case of determining that the sensing distance is not received.

It can be understood that the electronic sensing submodule is configured to broadcast a sensed signal. In a case that the electronic sensing submodule enters a sensing range of the signal receiver, the signal receiver receives the sensed signal to achieve sensing between the electronic sensing submodule and the signal receiver, and analyzes a sensing distance between the electronic sensing submodule and the signal receiver according to signal intensity of the sensed signal. This is suitable for an indoor or small-range region, to ensure the safety of the pet at home.

The satellite positioning submodule is configured to perform satellite positioning on the target pet, such as satellite map positioning of a Global Positioning System (GPS), to obtain the position information of the target pet. This helps to quickly retrieve a lost pet and greatly improves the safety of the pet.

In practical execution, the electronic sensing submodule broadcasts a sensed signal every t1 minute to achieve active Bluetooth radar positioning. In a case that the signal receiver arranged at the entry door detects the sensed signal of the electronic sensing submodule, the sensing distance of the target pet can be obtained through the signal intensity of the sensed signal. The first pet position of the target pet can be obtained in conjunction with the position information of the satellite positioning submodule. In a case that the sensed signal is not detected, the satellite positioning submodule performs satellite map positioning every t2 minutes, and the position information of the satellite positioning of the satellite positioning submodule is used as the second pet position of the target pet. The interval t1 is less than the interval t2. Since the Bluetooth technology has lower power consumption than that of satellite positioning, use of the higher-frequency Bluetooth radar positioning helps to reduce the energy consumption and prolong the battery life of the collar. In a case that the sensed signal is not detected, use of the lower-frequency satellite positioning can ensure that the position of the pet is accurately tracked within a larger range to meet an outdoor positioning need.

In addition, the terminal device receives the first pet position and the second pet position, which can also be used for fitting the first pet position and the second pet position, generating a more accurate activity route for the target pet, and displaying the route.

In this embodiment, the positioning sensing module 111 can provide an accurate pet positioning service within different ranges by combining the electronic sensing submodule with the satellite positioning submodule.

In some embodiments, the electronic sensing submodule includes a Bluetooth low energy tag, and the signal receiver is a Bluetooth adapter.

The electronic sensing submodule is provided with a Bluetooth Low Energy (BLE) tag, and the sensed signal is a Bluetooth broadcast signal. The Bluetooth adapter arranged at the entry door is used to sense and detect the BLE tag of the electronic sensing submodule.

Wherein, a radius of a sensing region corresponding to the BLE tag is 20 meters.

It should be noted that the BLE tag has a unique Bluetooth ID. The BLE tag is sensed through the signal receiver, to sense the target pet carrying the BLE tag and identify the unique Bluetooth ID. A radio frequency identification (RFID) tag has a short sensing distance and is not suitable for an application scenario of pet positioning. An infrared tag has chaotic signals and is easily affected by environmental interference, causing incorrect recognition. The signal receiver can accurately recognize the BLE tag within 20 meters.

The signal receiver obtains the signal intensity of the sensed signal, and calls, according to the signal intensity, a log-distance path loss model to calculate a pet distance of the target pet Distance:

$$\text{Distance} = 10^{\frac{RSSI_{measured} - RSSI_{reference}}{10-n}}$$

wherein $RSSI_{measured}$ is a measured RSSI value; $RSSI_{reference}$ is a reference RSSI value at a known distance; and n is a path loss index, which is usually between 2 and 4 and can be set according to an environment.

The sensed signal is the BLE broadcast signal of the BLE tag, and the signal intensity can be represented as an RSSI value of the BLE broadcast signal, in decibel (dB).

The signal receiver can be integrated into the entry door of the intelligent pet door and window, and receive the BLE broadcast signal emitted by the BLE tag in a case that the intelligent pet collar is within 20 meters to the entry door.

In this embodiment, the Bluetooth adapter is configured to perform large-range sensing and precise recognition on the Bluetooth low energy tag carried by the target pet, which improves the reliability of the intelligent pet ecosystem.

Figure 4:
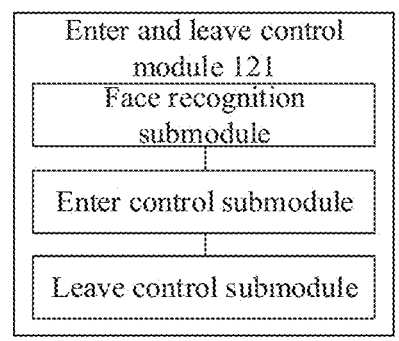
FIG. 4 is a schematic structural diagram of an enter and leave control module according to an embodiment of the present application.

In some embodiments, as shown in FIG. 4, the enter and leave control module 121 includes an enter control submodule and a leave control submodule which are communicably connected to each other.

The enter control submodule is configured to: determine the sensing distance in the first pet position in a case that the first pet position of the electronic sensing submodule has been received; and control the entry door to be opened in a case of determining, according to the first pet position, that the target pet is located beyond the living range and the sensing distance is beyond a security alert range, wherein the security alert range represents that a distance to the entry door is within 5 cm.

The leave control submodule is configured to control the entry door to be opened in a case of determining that the first pet position is within the living range and beyond the security alert range and a number of times the sensing distance being less than a preset door line distance is greater than a preset number of times.

It can be understood that the sensed signal may be a Bluetooth signal, a Near Field Communication (NFC) signal, a Wi-Fi signal, a Radio Frequency (RF) signal, or the like. Correspondingly, the electronic sensing submodule is provided with an electronic tag or chip that can generate corresponding sensing.

The sensed signal can include information such as the signal intensity and the first pet position.

The enter control submodule further determines the precise sensing distance between the target pet and the entry door according to the first pet position recognized by the BLE tag. When the target pet approaches or leaves the intelligent pet house, the enter control module 121 can automatically manage the opened/closed state of the entry door.

Within the security alert range, there may be a risk of pinching, injuring, or frightening the target pet during the opening and closing of the entry door. It is necessary to control the opening and closing of the entry door when the target pet is beyond the security alert range. The security alert range may be within 5 cm to the entry door inside and outside the intelligent pet house, which can avoid the risk of closing the door if the target pet does not completely leave and further improve the safety performance.

The preset door line distance is a distance between a door line arranged on an inner side of the entry door of the intelligent pet house and the entry door. The number of times the sensing distance being less than the preset door line distance is used for representing a number of times the target pet wandering near the entry door. It can reflect an intention of leaving of the target pet.

The enter control submodule manages the opened/closed state of the entry door in a case that the target pet is located beyond the living range and needs to return to the intelligent pet house, and opens the entry door in a timely manner when the target pet enters the intelligent pet house.

The leave control submodule manages the opened/closed state of the entry door in a case that the target pet is located within the living range and needs to go out from the intelligent pet house.

In practical execution, the enter control submodule is configured to: determine the sensing distance in the first pet position in a case that the first pet position of the electronic sensing submodule has been received; and control the entry door to be opened in a case of determining, according to the first pet position, that the target pet is located beyond the living range and the sensing distance is beyond a security alert range, so that the target pet can enter the intelligent pet house. This can prevent the entry door from being opened by mistake due to signal interference or a mis-operation, ensure that the target pet smoothly enters the intelligent pet house, and effectively avoid a risk that the target pet is pinched by the entry door when passing through the entry door.

In a case of determining, according to the first pet position, that the target pet is located beyond the living range, the signal intensity is within a preset intensity range, the sensing distance is beyond the security alert range, the number of times the sensing distance being less than the preset door line distance is greater than the preset number of times, the enter and leave control module 121 controls the entry door to be opened, and the target pet can go out from the intelligent pet house.

In addition, when the target pet approaches the intelligent pet house and is within a range of 3 m to the entry door, the enter control submodule detects an increase in the sensed signal, and the sensed signal is within the preset intensity range. The enter control submodule controls an entry door driving device to drive the entry door to be opened or closed, thereby achieving automatic enter and leave control over the target pet.

In a case that the target pet has completely entered the intelligent pet house and is more than 5 cm away from the entry door, and it is determined, according to the positional relationship between the pet position and the living range, that the target pet is in the intelligent pet house, the enter control submodule confirms that the target pet is within the security alert range of the intelligent pet house, and automatically closes the entry door. In a case of determining that the entry door is opened and the distance between the target pet and the entry door is less than the preset door line distance, the entry door is controlled to remain the opened state.

In a case of determining that the entry door is in the closed state, the target pet is within the living range, and the number of times the sensing distance being less than the preset door line distance is greater than the preset number of times, for example, in a case that it has been detected that the pet touches the door line continuously twice, the leave control submodule determines that the target pet has an intention of leaving, and controls the entry door to be opened and remain the opened state. This improves the intelligent recognition capability for behaviors of a pet and makes a door opening operation more accurate.

The enter control submodule and the leave control submodule are respectively responsible for performing gated management on the entry door when the target pet goes home and goes out, thereby ensuring that the target pet can freely enter and leave the intelligent pet house. This provides a more comfortable living environment for the pet, reducing manual operations of a user, and improving the convenience of life.

By integration of the Bluetooth recognition technology for the BLE tag worn by the pet with an advanced communication protocol (including Bluetooth, Wi-Fi, and the like), the various functional modules of the intelligent pet house and the remote monitoring capability of the terminal device are ingeniously combined, thereby creating a highly automatic and intelligent pet living environment.

In addition, the entry door is provided with an anti-pinch mechanism. For example, a resistance sensing device connected to the enter control submodule is arranged at the entry door. In a case that the enter control submodule determines that a resistance value acquired by the resistance sensing device exceeds a preset resistance value, the enter control submodule controls the entry door to be opened, which can effectively prevent the target pet from being accidentally pinched when passing through the entry door.

In this embodiment, by use of the enter control submodule and the leave control submodule to control the opening and closing of the entry door, the target pet can leave the intelligent pet house and go outdoors, and the entry door can be automatically managed when the target pet enters the intelligent pet house. Especially in adverse weather or when a user is not at home, the target pet can still freely enter and leave the intelligent pet house, enjoy outdoor activities, or return to the warm home.

In some embodiments, the intelligent pet house is provided with an image acquisition device, and the image acquisition device is connected to the leave control submodule of the enter and leave control module 121.

The image acquisition device is configured to acquire first image information inside the intelligent pet house.

The leave control submodule is further configured to control the entry door to be closed in a case of determining that the first image information includes the target pet.

Wherein, the image acquisition device can acquire video data in the intelligent pet house in real time, and transmit the video data to the leave control submodule in real time, and the leave control submodule forwards the video data to the terminal device for a user to remotely monitor the state of the target pet through the terminal device and view the state of the target pet in the intelligent pet house in real time.

In practical execution, the leave control submodule determines, according to whether video frames in the video data of the image acquisition device include the target pet, whether the target pet has been already in the intelligent pet house, and closes the entry door when the target pet is not in the house and an entry door distance sensed signal satisfies the security alert range.

In addition, through the common action of the video data of the image acquisition device and the enter control submodule, it confirms that the target pet has entered the intelligent pet house, and the door is closed after it ensures that the target pet has completely left the intelligent pet house within a range of 3 m. Controlling the entry door to be closed and remain closed further improves the safety and convenience of the system.

The combined use and cooperative work of the electronic sensing submodule and the enter control submodule in the intelligent pet collar 110 ensure that only the target pet wearing the intelligent pet collar 110 can enter or leave the intelligent pet house. This not only achieves automatic management of leaving and entering, but also saves electricity and improves the safety and accuracy of the intelligent pet house.

In this embodiment, the leave control submodule determines whether the first image information includes the target pet, to control the entry door to be closed and lock the target pet in the intelligent pet house, so that a more intelligent and comfortable living environment is created for the target pet.

In some embodiments, as shown in FIG. 4, the enter and leave control module 121 further includes a face recognition submodule. The face recognition submodule is connected to the enter control submodule of the enter and leave control module 121. The image acquisition device of the intelligent pet house is connected to the face recognition submodule.

The image acquisition device is further configured to acquire second image information at the entry door.

The face recognition submodule is further configured to trigger the enter control submodule to control the entry door to be opened in a case of determining that the second image information includes face information and the face information is successfully matched with a face of the target pet.

In practical execution, the face recognition submodule recognizes face information through a high-precision pet face recognition technology in a case of determining that the second image information includes the face information. In a case that the face information is successfully matched with the face of the target pet, the face recognition submodule controls the entry door to be opened, so that the target pet can freely enter and leave the house, thereby achieving rapid verification and recognition of the identity of the pet and avoiding a risk of failure of the BLE tag in the electronic sensing submodule.

In addition, in a case that the pet position of the target pet is located beyond the security alert range for more than a preset duration, the enter control submodule normally closes and locks the entry door, or can automatically lock the entry door at night, which can prevent illegal intrusion of an external animal or person and greatly improve the security protection capability of the intelligent pet house.

In this embodiment, the face recognition submodule is used to recognize and verify the identity of the target pet, which prevents a non-permitted pet or other animals from entering the intelligent pet house, thereby achieving non-intrusive operations when the target pet approaches or leaves the intelligent pet house, and improving the intelligence level of the intelligent pet house.

Figure 5:
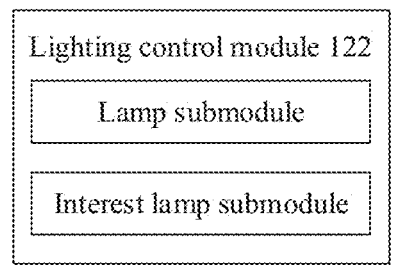
FIG. 5 is a schematic structural diagram of a lighting control module according to an embodiment of the present application.

In some embodiments, the intelligent pet lighting system includes a lamp and an interest lamp. As shown in FIG. 5, the lighting control module 122 includes a lamp submodule and an interest lamp submodule.

The lamp submodule is configured to: control the lamp to be turned off in a case of determining that the pet position is beyond the living range, and control the lamp to be turned on in a case of determining that the pet position is within the living range.

The interest lamp submodule is configured to control the interest lamp to act in a case that the recall signal has been received.

The lamp and the interest lamp are both lighting devices in the intelligent pet lighting system. The lamp can include a main lamp inside the intelligent pet house, an observation down lamp, and an external lamp outside the intelligent pet house.

In practical execution, the lamp submodule performs intelligent lighting management on the intelligent pet house. When the pet position is within the living range, it determines that the target pet has returned to the intelligent pet house and the main lamp inside the intelligent pet house is turned on. When the pet position is beyond the living range, it determines that the target pet leaves the intelligent pet house and the main lamp inside the intelligent pet house is turned off, so that the target pet can enjoy a suitable lighting environment when entering and leaving the intelligent pet house, which improves the living comfort of the target pet and provides a more intelligent living environment for the target pet. This also avoids a waste of energy caused by long-term lighting.

The lamp submodule can further turn on or turn off the external lamp of the intelligent pet house according to natural light changes, to automatically adjust outdoor lighting of the intelligent pet house. For example, through light sensing, in a case of sensing that brightness is less than a brightness threshold, the lamp submodule controls the external lamp of the intelligent pet house to be turned on, thereby achieving intelligent management on lighting, avoiding a waste of energy, and contributing to energy conservation and environmental protection.

The terminal device can control the observation down lamp in the intelligent pet house to be turned on by sending an instruction to the lamp submodule. A user can flexibly adjust a lighting condition when the user needs to observe or clean the intelligent pet house, thereby improving the convenience and flexibility of use.

In a case that the interest lamp submodule receives a recall signal, if the recall signal includes a visual recall signal, visual stimulation needs to be performed on the target pet in order to recall the target pet. The interest lamp submodule controls the interest lamp to flash at a preset frequency or be lit up according to a set lighting trajectory to attract the target pet to move towards the interest lamp and achieve a recall effect.

The interest lamp submodule can work in conjunction with the collar. In a case that the interest lamp submodule has received the visual recall signal, the interest lamp module can control the interest lamp to quickly attract the attention of the target pet in a visual recall manner, thereby increasing the success rate of recall through visual attraction.

In this embodiment, fine lighting management of the intelligent pet house is achieved through the lamp submodule and the interest lamp submodule.

In some embodiments, the interest lamp submodule is further configured to control the interest lamp to act according to a lighting trajectory and lighting duration of the training plan, to guide the target pet to be trained according to the training plan.

The interest lamp is designed according to a lighting and flashing pattern that makes the target pet easily attracted.

For example, the interest lamp can include a laser pen. The lighting trajectory can be a movement trajectory of a light spot of the laser pen. When the lighting trajectory and lighting duration of the training plan are generated, a preference and motion duration of the target pet are fully considered. The interest lamp submodule sets the lighting trajectory and lighting duration of the light spot of the laser pen according to the training plan. The attention of the target pet is attracted through the light spot or other patterns, to stimulate the instinct of the pet to capture and chase and guide the target pet to be trained according to the training plan.

The lighting trajectory may be a circular, straight, curved, or mixed-line trajectory.

In this embodiment, by use of the interest lamp submodule to control the interest lamp according to the personalized lighting trajectory and lighting duration, the target pet is guided to be trained according to the training plan. This helps maintain the healthy weight of the target pet, provides psychological stimulation, reduces the anxiety and boredom of the target pet, and can save the energy of a user and improve the living experience of the target pet.

In addition, the lamp submodule can further control the lamp to switch among different lighting combination working modes according to a lighting control instruction sent by the terminal device. The working modes at least include a sleep mode and a normally-on mode. The sleep mode is configured to turn off all the lamps when it is determined that the pet is in the house and does not move for a long time, and turn on the main lamp when it is determined that the pet moves frequently from the state of not moving.

In practical execution, the lamp submodule controls the lamp to switch to different working modes according to a selection of the terminal device.

For example, the lamp submodule can specifically control all the lamps to be turned off when the target pet does not move for a long time, to create a more peaceful resting environment. When the target pet starts to move, the lamp submodule controls the main lamp to be turned on, to ensure that the target pet has sufficient light when moving.

In this embodiment, by controlling the working mode of the lamp, a personalized scene setting can be provided, which enhances user experience and satisfaction, and improves the living comfort of the pet.

In some embodiments, the recall signal includes a visual recall signal, a tactile recall signal, and an auditory recall signal.

Figure 6:
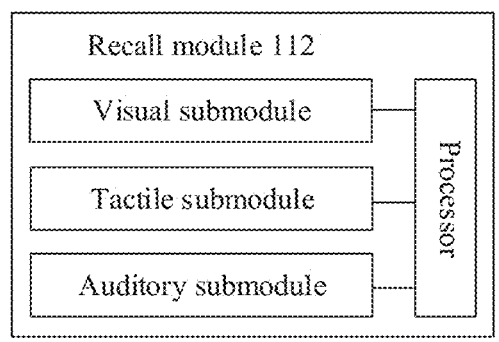
FIG. 6 is a schematic structural diagram of a recall module according to an embodiment of the present application.

As shown in FIG. 6, the recall module 112 includes a processor, and a visual submodule, a tactile submodule, and an auditory submodule which are connected to the processor.

The processor is configured to: in a case of determining, according to a pet distance between the living range and the pet position, that the pet distance is greater than or equal to a pre-warning distance threshold, trigger the visual submodule to generate the visual recall signal, and send the visual recall signal to the lighting control module 122;

in a case of determining that the pet distance is less than the pre-warning distance threshold and greater than a safe distance threshold, trigger the tactile submodule to generate the tactile recall signal; and in a case of determining that the pet distance is less than the safe distance threshold, trigger the auditory submodule to generate the auditory recall signal. A value range of the pre-warning distance threshold is 5 meters to 15 meters; and a value range of the safe distance threshold is 15 meters to 20 meters.

The pre-warning distance threshold is greater than the safe distance threshold.

For example, in the case of recalling the target pet, the attention of the target pet is first attracted through visual recall, and then the visual recall is gradually transitioned to tactile or auditory recall to gradually guide the pet to return, thereby helping to maintain the interest and attention of the pet and improve the recalling efficiency.

In practical execution, when the processor determines that the distance between the pet position and the living range is greater than or equal to the pre-warning distance threshold, the visual submodule sends the visual recall signal to the interest lamp submodule. According to the visual recall signal, the interest lamp submodule controls the interest lamp to recall the target pet to the intelligent pet house in a visual recall manner. The value range of the pre-warning distance threshold is 5 meters to 15 meters.

When the processor determines that the distance between the pet position and the living range is less than the pre-warning distance threshold and is close to the safe distance threshold, the tactile submodule generates the tactile recall signal to recall the target pet to the intelligent pet house in a tactile recall manner. The tactile recall can be achieved by using vibration to recall the target pet to the intelligent pet house.

When the processor determines that the distance between the pet position and the living range is greater than or equal to the safe distance threshold, the auditory submodule generates the auditory recall signal and recalls the pet to the intelligent pet house in an auditory recall manner. The value range of the safe distance threshold is 15 meters to 20 meters. If the safe distance threshold is greater than the pre-warning distance threshold, the auditory recall can be achieved by playing user recordings to recall the target pet to the intelligent pet house.

In this embodiment, by obtaining the pet position in real time, when the target pet is beyond a preset pre-warning range or safety range, different recall methods are dynamically switched according to the distance between the target pet and the intelligent pet house, thus achieving multi-level and more comprehensive recall based on different sense organs, until the target pet returns to the intelligent pet house. This improves the success rate and efficiency of recall and avoids anxiety or fear of the pet that may be caused by a traditional recall method.

In some embodiments, the environment adjustment module 123 includes a noise control submodule and an air index control submodule. The intelligent pet cooling and heating fresh air system includes a dust purification device, a deodorization device, and an air conditioning device.

The noise control submodule is configured to control the intelligent pet cooling and heating fresh air system to shut down the devices in a case of determining that a noise intensity in the intelligent pet house is greater than a preset decibel.

The air index control submodule is configured to: control the dust purification device to operate according to a dust concentration in the intelligent pet house, control the deodorization device to operate according to an odor intensity in the intelligent pet house, and control the air conditioning device to operate according to an indoor temperature in the intelligent pet house.

It can be understood that the intelligent pet house is provided with the air conditioning device, the deodorization device, and the dust purification device, and each system is configured with an operation priority. The operations of these devices enable the intelligent pet house to maintain a constant temperature, a constant humidity, stillness, cleanliness, and a constant oxygen level, which provides a comfortable and healthy living environment for the pet.

The noise control submodule defines a preset decibel. The preset decibel can be adjusted by the terminal device according to the tolerance of the target pet to noise, in order to meet needs for pets for individual differences.

In practical execution, a main source of the noise in intelligent pet house is the devices. The operations of the devices can be managed, to control the noise intensity. When the noise intensity in the intelligent pet house is greater than the preset decibel, the noise control submodule can control a device with a low operation priority to be shut down.

The air index control submodule can not only control the operations of the dust purification device and the deodorization device, but also control the air conditioning device of the intelligent pet house. The air conditioning device has functions such as temperature adjustment, fresh air, and dehumidification. The fresh air mode can effectively increase the oxygen level of air in the intelligent pet house.

In a case that the air index control submodule determines that the temperature inside the intelligent pet house exceeds a preset temperature range at each time the target pet returns to the intelligent pet house, the air index control submodule controls the air conditioning device to operate, and then controls the air conditioning device to be shut down until the temperature inside the intelligent pet house is within the preset temperature range.

When the air index control submodule determines that the humidity inside the intelligent pet house exceeds a preset humidity range, the air index control submodule controls the air conditioning device to activate the dehumidification function to adjust the humidity inside the intelligent pet house, and then controls the air conditioning device to be shut down until the humidity inside the intelligent pet house is within the preset humidity range.

When the air index control submodule determines that the dust concentration inside the intelligent pet house exceeds a preset dust concentration, the air index control submodule controls the dust purification device to operate, and then controls the dust purification device to be shut down until the dust concentration is less than the preset dust concentration.

When the air index control submodule determines that the odor intensity inside the intelligent pet house exceeds a preset odor intensity, the air index control submodule controls the deodorization device to deodorize the intelligent pet house, and controls the deodorization device to be shut down until the odor intensity is less than the preset odor intensity.

The air index control submodule automatically shuts down the corresponding devices when the environment in the intelligent pet house meets a preset standard, thereby avoiding an unnecessary waste of energy.

It should be noted that the preset temperature range, the preset humidity range, the preset dust concentration, and the preset odor intensity can all be set and adjusted by a user through the terminal device.

In this embodiment, the noise control submodule and the air index control submodule are used to control the environment in the intelligent pet house, which creates a good living environment for the target pet and improves the living quality of the target pet. Through comprehensive control over noise and air, it ensures that the environment in the intelligent pet house is always maintained in the most suitable state for the target pet to live in, which helps to improve the comfort of the target pet and reduce discomfort or health problems caused by environmental changes.

In addition, "first feature" and "second feature" may include one or more of the features.

In the descriptions of the present application, "a plurality" means two or more.

The embodiments of the present application have been described above with reference to the accompanying drawings. This application is not limited to the specific implementations described above, and the specific implementations described above are merely examples and not limitative. Those of ordinary skill in the art may make various forms under the teaching of the present application without departing from the spirit of the present application and the protection scope of the claims, and these forms shall all fall within the protection of the present application.

In the description of this specification, the description referring to the terms "one embodiment", "some embodiments", "exemplary embodiment" "an example", "specific examples", "some examples", or the like means that specific features, structures, materials or characteristics described in connection with the embodiments or examples are included in at least one embodiment or example of the present application. In this specification, the schematic representations of the above terms are not necessarily intended to refer to the same embodiment or example. Furthermore, the specific features, structures, materials or characteristics described may be combined in any suitable manner in any one or more embodiments or examples.

Although the embodiments of the present application have been shown and described, it can be understood by those of ordinary skill in the art that various changes, modifications, substitutions, and variations can be made to these embodiments without departing from the principle and purpose of the present application. The scope of the present application is defined by the claims and their equivalents.

What is claimed is:

1. An intelligent pet ecosystem, comprising an intelligent pet collar and an intelligent pet house central control system which are communicably connected to each other, the intelligent pet house central control system is connected to an embedded functional module in an intelligent pet house; a target pet wears the intelligent pet collar; the intelligent pet house is configured to define a living range of the target pet;

the intelligent pet collar comprises a positioning sensing module, a recall module, and a motion module;

the positioning sensing module is configured to acquire a pet position of the target pet;

the recall module is connected to the positioning sensing module and is configured to generate a recall signal based on a positional relationship between the living range and the pet position, and the recall signal is used for guiding the target pet to return to the intelligent pet house;

the motion module is connected to the positioning sensing module and is configured to: acquire motion information of the target pet, and generate a feeding plan and a training plan for the target pet according to the motion information;

the intelligent pet house central control system comprises an enter and leave control module, a lighting control module, and an environment adjustment module; the embedded functional module comprises an intelligent pet door and window, an intelligent pet lighting system, and an intelligent pet cooling and heating fresh air system;

the enter and leave control module is configured to control an open/close state of an entry door of the intelligent pet door and window based on the positional relationship between the living range and the pet position;

the lighting control module is configured to control a working state of the intelligent pet lighting system based on the positional relationship between the living range and the pet position; and the environment adjustment module is configured to control a working state of the pet cooling and heating fresh air system according to environment information of the intelligent pet house.

2. The intelligent pet ecosystem according to claim 1, wherein the pet position comprises a first pet position and a second pet position; the positioning sensing module comprises an electronic sensing submodule and a satellite positioning submodule which are communicably connected to each other; the intelligent pet door and window comprises a signal receiver arranged at the entry door;

the electronic sensing submodule is configured to sense the signal receiver to determine a sensing distance of the target pet; and the satellite positioning submodule is configured to: acquire position information of the target pet; determine the first pet position according to the sensing distance and the position information in a case of determining that the sensing distance has been received; and determine the position information to be the second pet position in a case of determining that the sensing distance is not received.

3. The intelligent pet ecosystem according to claim 2, wherein the electronic sensing submodule comprises a Bluetooth low energy tag, and the signal receiver is a Bluetooth adapter.

4. The intelligent pet ecosystem according to claim 2, wherein the enter and leave control module comprises an enter control submodule and a leave control submodule which are communicably connected to each other;

the enter control submodule is configured to: determine the sensing distance in the first pet position in a case that the first pet position of the electronic sensing submodule has been received; and control the entry door to be opened in a case of determining, according to the first pet position, that the target pet is located beyond the living range and the sensing distance is beyond a security alert range, wherein the security alert range represents that a distance to the entry door is within 5 cm;
the leave control submodule is configured to control the entry door to be opened in a case of determining that the first pet position is within the living range and beyond the security alert range and a number of times the sensing distance being less than a preset door line distance is greater than a preset number of times.

5. The intelligent pet ecosystem according to claim 3, wherein the intelligent pet house is provided with an image acquisition device, and the image acquisition device is connected to the leave control submodule of the enter and leave control module;
the image acquisition device is configured to acquire first image information inside the intelligent pet house; and
the leave control submodule is further configured to control the entry door to be closed in a case of determining that the first image information comprises the target pet.

6. The intelligent pet ecosystem according to claim 1, wherein the enter and leave control module further comprises a face recognition submodule; the face recognition submodule is connected to the enter control submodule of the enter and leave control module; the image acquisition device of the intelligent pet house is connected to the face recognition submodule;
the image acquisition device is further configured to acquire second image information at the entry door; and
the face recognition submodule is further configured to trigger the enter control submodule to control the entry door to be opened in a case of determining that the second image information comprises face information and the face information is successfully matched with a face of the target pet.

7. The intelligent pet ecosystem according to claim 1, wherein the intelligent pet lighting system comprises a lamp and an interest lamp; the lighting control module comprises a lamp submodule and an interest lamp submodule;
the lamp submodule is configured to: control the lamp to be turned off in a case of determining that the pet position is beyond the living range, and control the lamp to be turned on in a case of determining that the pet position is within the living range; and
the interest lamp submodule is configured to control the interest lamp to act in a case that the recall signal has been received.

8. The intelligent pet ecosystem according to claim 7, wherein the interest lamp submodule is further configured to control the interest lamp to act according to a lighting trajectory and lighting duration of the training plan, to guide the target pet to be trained according to the training plan.

9. The intelligent pet ecosystem according to claim 1, wherein the recall signal comprises a visual recall signal, a tactile recall signal, and an auditory recall signal;
the recall module comprises a processor, and a visual submodule, a tactile submodule, and an auditory submodule which are connected to the processor;
the processor is configured to: in a case of determining, according to a pet distance between the living range and the pet position, that the pet distance is greater than or equal to a pre-warning distance threshold, trigger the visual submodule to generate the visual recall signal, and send the visual recall signal to the lighting control module; in a case of determining that the pet distance is less than the pre-warning distance threshold and greater than a safe distance threshold, trigger the tactile submodule to generate the tactile recall signal; and in a case of determining that the pet distance is less than the safe distance threshold, trigger the auditory submodule to generate the auditory recall signal; a value range of the pre-warning distance threshold is 5 meters to 15 meters; and a value range of the safe distance threshold is 15 meters to 20 meters.

10. The intelligent pet ecosystem according to claim 1, wherein the environment adjustment module comprises a noise control submodule and an air index control submodule; the intelligent pet cooling and heating fresh air system comprises a dust purification device, a deodorization device, and an air conditioning device;
the noise control submodule is configured to control the intelligent pet cooling and heating fresh air system to shut down the devices in a case of determining that a noise intensity in the intelligent pet house is greater than a preset decibel; and
the air index control submodule is configured to: control the dust purification device to operate according to a dust concentration in the intelligent pet house, control the deodorization device to operate according to an odor intensity in the intelligent pet house, and control the air conditioning device to operate according to an indoor temperature in the intelligent pet house.

* * * * *